United States Patent
Zeng et al.

(10) Patent No.: US 8,237,624 B2
(45) Date of Patent: Aug. 7, 2012

(54) SYSTEM HAVING CAPABILITY FOR DAISY-CHAINED SERIAL DISTRIBUTION OF VIDEO DISPLAY DATA

(75) Inventors: Xuming Henry Zeng, Sunnyvale, CA (US); Jechan Kim, Cupertino, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 703 days.

(21) Appl. No.: 12/115,917

(22) Filed: May 6, 2008

(65) Prior Publication Data

US 2009/0278763 A1    Nov. 12, 2009

(51) Int. Cl.
*G09G 5/00* (2006.01)
(52) U.S. Cl. .................. 345/1.1; 345/1.2; 345/2.2
(58) Field of Classification Search ............... 345/1.1–4, 345/96–100, 204–215
See application file for complete search history.

(56) References Cited

U.S. PATENT DOCUMENTS

| | | | |
|---|---|---|---|
| 6,323,854 B1 | 11/2001 | Knox et al. | |
| 6,384,846 B1 * | 5/2002 | Hiroi | 715/794 |
| 6,397,275 B1 * | 5/2002 | Clapp et al. | 710/60 |
| 6,411,302 B1 * | 6/2002 | Chiraz | 345/545 |
| 6,681,001 B1 * | 1/2004 | Clayton et al. | 379/93.05 |
| 2002/0118144 A1 | 8/2002 | Edmonds | |
| 2009/0182917 A1 | 7/2009 | Kim | |
| 2009/0322767 A1 | 12/2009 | Douglas et al. | |

OTHER PUBLICATIONS

VESA (Video Electronics Standards Association), "DisplayPort™ Standard", Version 1, Mar. 19, 2007 (228 pages).
PCT International Search Report and the Written Opinion mailed Sep. 21, 2009, in related International Application No. PCT/US2009/002811.
PCT International Preliminary Report on Patentability mailed Nov. 18, 2010, in related International Application No. PCT/US2009/002811.
Preliminary Amendment filed Feb. 26, 2010, in related U.S. Appl. No. 12/014,341.
Office Action mailed Dec. 8, 2010, in related U.S. Appl. No. 12/014,341.
Amendment and Response to Office Action filed Mar. 31, 2011, in related U.S. Appl. No. 12/014,341.
Final Office Action mailed Jun. 7, 2011, in related U.S. Appl. No. 12/014,341.
Amendment w/ RCE filed Aug. 22, 2011, in related U.S. Appl. No. 12/014,341.

* cited by examiner

*Primary Examiner* — Vijay Shankar
(74) *Attorney, Agent, or Firm* — Hayes and Boone, LLP

(57) ABSTRACT

A serial display interface such as the VESA-Display Port interface is expanded to support daisy chained coupling of one display monitor to the next. Each daisy chain wise connectable display monitor has a local daisy chain transceiver device associated with it where the local transceiver device selectively picks off passing through video data streams in response to embedded MDID identification signals and forwards the selectively picked off data to the local monitor. The local transceiver device also relays the passing through video data streams on to more downstream devices of the daisy chain. In one embodiment, the daisy chain wise connectable display monitors are hot-pluggable and unpluggable.

24 Claims, 6 Drawing Sheets

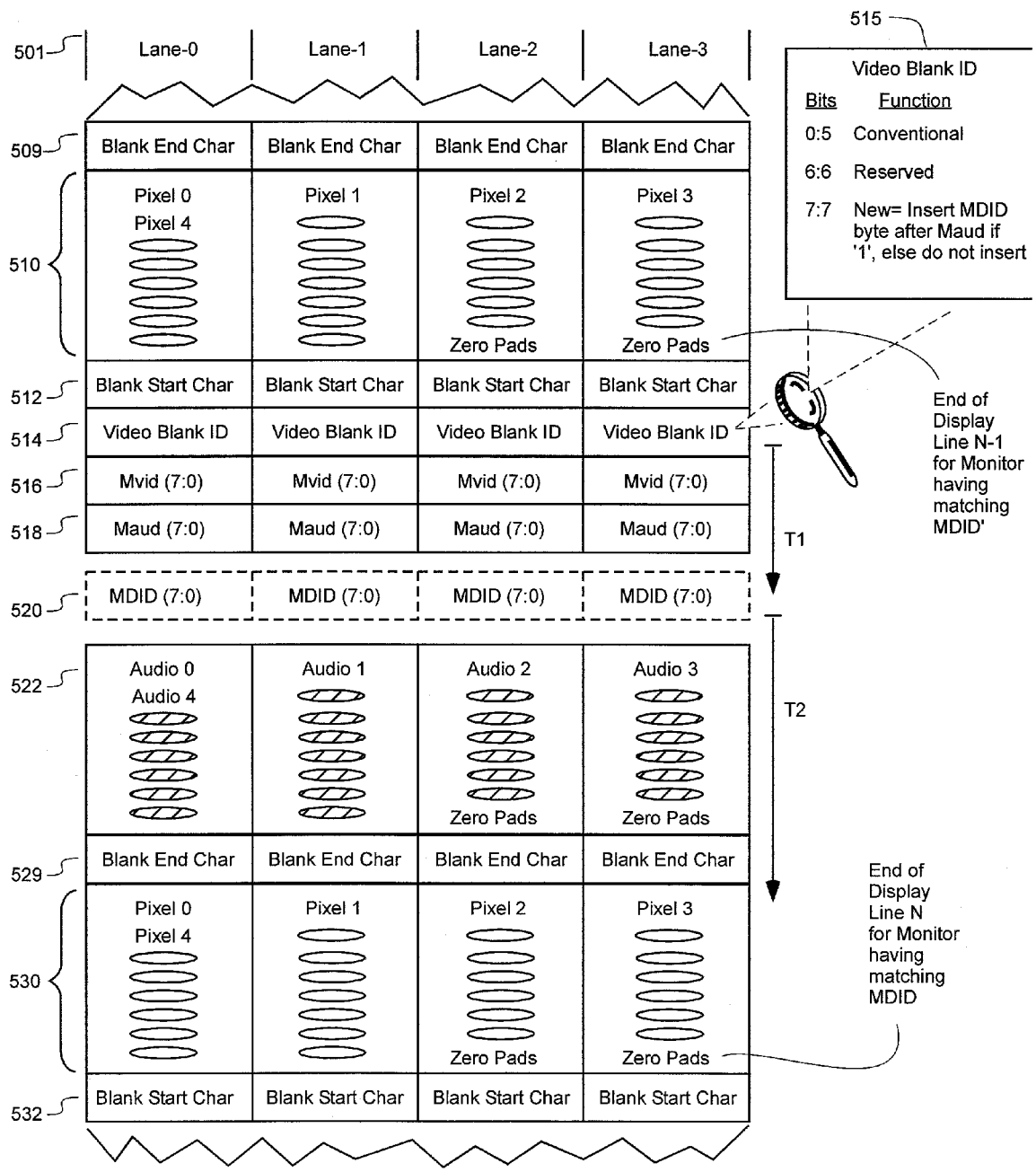

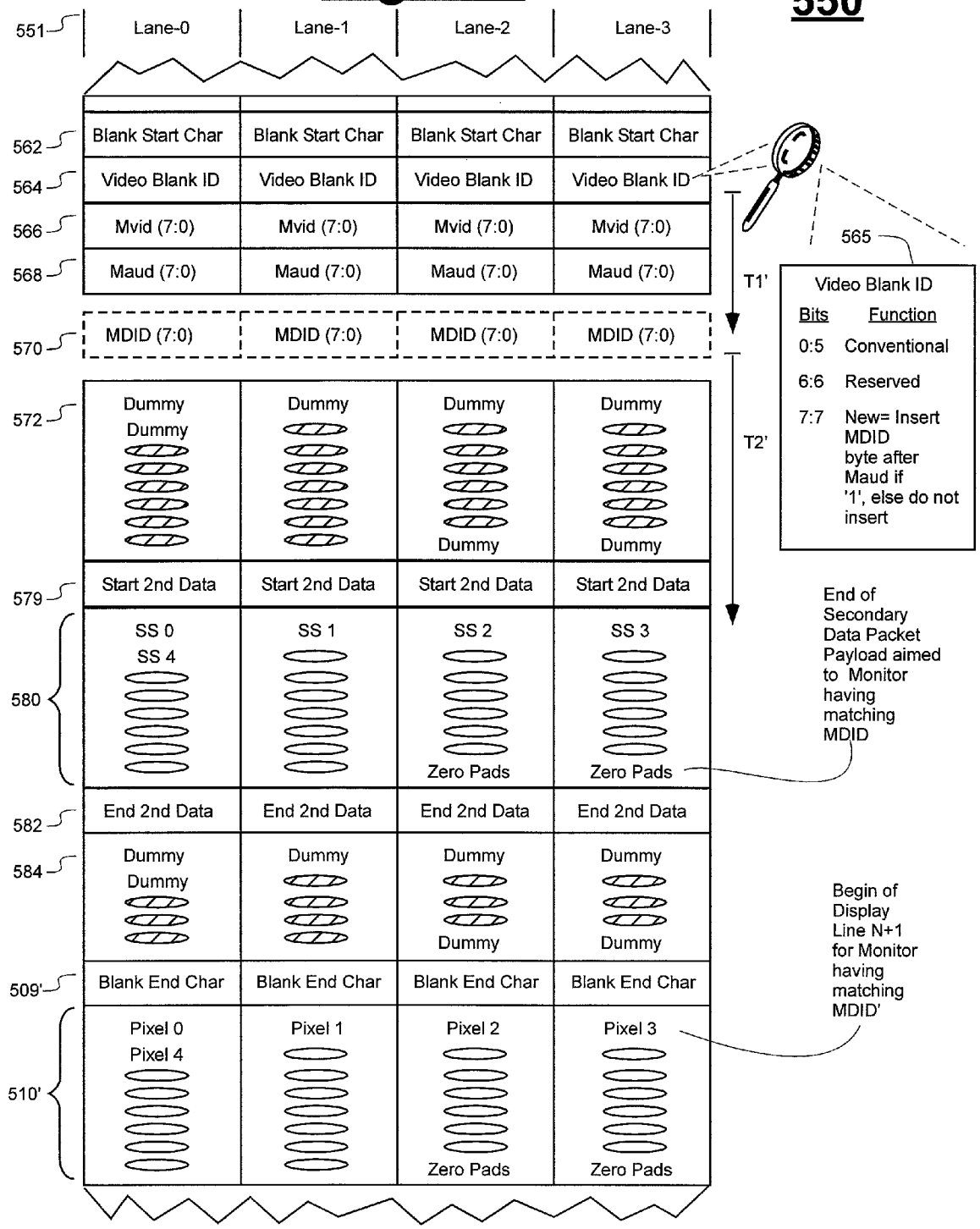

SYSTEM HAVING CAPABILITY FOR DAISY-CHAINED SERIAL DISTRIBUTION OF VIDEO DISPLAY DATA

FIELD OF DISCLOSURE

The present disclosure of invention relates generally to video display and distribution systems. The disclosure relates more specifically to serial transmission of high definition video signals from a source device to one or more sink devices.

CROSS REFERENCE TO RELATED APPLICATION

The following copending U.S. patent application is owned by the owner of the present application, and its disclosure is incorporated herein by reference:

(A) Ser. No. 12/014,341 filed Jan. 15, 2008 by Jechan Kim and which is originally entitled, System Having Capability for Daisy-Chained Serial Distribution of Video Display Data.

DESCRIPTION OF RELATED TECHNOLOGIES

Recently video display technologies have been improving to the point where it is possible for home users to attach a high definition display monitor to their home computer or home theatre entertainment center. A number of reconfigurable interconnects schemes have been proposed which allow users to upgrade their display monitors from those of low resolution to higher resolution ones as newer display technologies (e.g., high definition displays) become available.

For example, the Video Electronics Standards Association (VESA) approved in April 2007 a version 1.1 of a serial transmission based interface known as Display Port (the VESA-DP 1.1 specification). Both the earlier and 1.1 version VESA-DP protocols call for a cable and a pair of interconnects (plugs) that support up to four lanes of serial data transmission from a video source device to a video sink device. In addition there is a fifth, or so-called auxiliary channel which supports serial transmission of bidirectional control data. Each of the four video data lanes is required to have a bandwidth of at least 1.62 gigabits per second supported over a cable length of at least 15 meters, or optionally upgraded to 2.7 Gbit/s per lane for higher resolution but required to be supported only over a shorter cable of at least 3 meters in length.

If a video signal is transmitted over only a single lane, that transmission should be sufficient to support a medium resolution video sink device of 1080 pixels per scan line (by 800 horizontal lines) at 24 bits per pixel and 50 or 60 frames per second. If the video resolution of the sink device is doubled both vertically and horizontally to as much as 2,560 pixels per horizontal line by 1,600 horizontal lines per frame, then all four transmission lanes of the VESA-DP interconnect are used to transfer the video data digitally. The fifth auxiliary channel carries control data for coordinating the interlacing or other mixing of the first four channels. Bandwidth is additionally provided for a maximum of 8 channels of uncompressed audio signal transmitted at 6.144 megabits per second on a time shared basis. In one embodiment a differential drive signal is used for each of the lanes. A 20 pin external connector is provided where 10 of the pins are dedicated for supporting the differential signal drive pairs for the four lanes and the auxiliary channel. The remaining pins provide ground shields, hot plug detection and connector-supplied power as well as a connector power return.

The VESA/DP 1.1 protocol is not the only one that supports serial transmission of video data. Other protocols used within the industry include the Unified Display Interface (UDI), the Digital Video Interface (DVI) and the High Definition Media Interface (HDMI). A number of these protocols, including the VESA/DP protocol support content copy protection (CP) by use of various encryption techniques. The VESA Display Port Content Protection (DPCP) scheme uses a 128-bit AES encryption technique. The HDMI protocol uses a slightly different protection technique known as HDCP.

As of late, a number of large companies in the industry have begun to support the VESA/DP protocol as the main protocol for transmitting high definition video or lower resolution video from a computer or a home theatre entertainment center to a high definition display monitor or to a lesser monitor. The present disclosure will focus on the VESA/DP protocol. However it is to be understood that disclosure is not limited to this one protocol alone and its teachings may be applied to other multi-lane serial video distribution systems.

Aside from the introduction of new video connector protocols (e.g., VESA-DP), another separate but recent trend in the industry has been the use to plural video monitors in certain applications. For example, some power computer users require large amounts of application desktop display space for their software programs. Various computers, including laptop computers, generally come with at least one external video jack for supporting an external or auxiliary monitor in addition to the main monitor supported by an internal video connection or a primary video jack. Software is available so that the additional or auxiliary monitor can be used simultaneously with the main monitor and so that the display space of the auxiliary monitor can then supplement the limited display space provided by the main monitor.

However for some special applications, two monitors alone may not be enough. So-called power users may clamor for an even larger number of display monitors besides the usual two driven by their special purpose software. Satisfaction of this desire for more display area is difficult to realize, particularly in the case of laptop computers because there is only so much connector space available on the motherboard of the laptop (or desktop) computer and because the addition of further video connectors and supporting circuitry becomes relatively expensive. Not all users are power users who will employ the additional video jacks plus hardware. So for them, the addition of more video jacks and associated hardware is a cost with no apparent benefit. Accordingly, from an economic incentives point of view, manufacturers who supply the general public (not the power user subpopulation) are strongly motivated to continue to provide only one auxiliary monitor jack so as to thereby not add unnecessary costs to their products.

SUMMARY

Structures and methods may be provided in accordance with the present disclosure of invention for improving over the above-described problems relating to the allowing of display of different images on respective ones of plural display monitors.

More specifically, in accordance with one aspect of the present disclosure, a digital display monitor is provided with two VESA-DP connectors, one for plug-wise receiving a plurality of serial video lane signals and the second for forwarding (relaying) all of the received video signals to yet a further monitor that is plug-wise removably connected daisy chain style with the first monitor.

More specifically, in one embodiment, a VESA-DP compatible transceiver circuit (e.g., a monolithic integrated circuit chip) is provided as a dynamically programmable relaying circuit that operates in a first mode as a conventional VESA-DP sink circuit. However, it operates in a second programmably selectable mode as a serial data router that selectively responds to some of passing-through data for local display (if a multi-device/data identification or MDID value matches) and it also relays the passing through data to a next-in-chain VESA-DP compatible transceiver circuit for possible display at that next locale and/or for further relaying of the video signals along the daisy chain to yet other display monitors. In one embodiment, the so-relayed signals are packed across four serial lanes as they are relayed downstream along the daisy chain so that the full bandwidth of the VESA-DP cable is used at all times.

When the above second mode is employed, time domain multiplexing may be used to interlace over time, signal bursts directed to different display monitors where the targeted monitor is identified by an MDID identification signal embedded in the video signal burst. Each of plural monitors that are sequentially daisy chain connected one to the next can be assigned a respective unique MDID identification value. Alternatively or additionally, two or more of the daisy chain connected monitors can be assigned a same MDID identification value, in which case they will both respond to a same video data burst that is relayed downstream along the daisy chain with that MDID identification value embedded in the burst.

The above-cited and here incorporated U.S. application Ser. No. 12/014,341 discloses an alternate method wherein spatial multiplexing is used instead of the temporal multiplexing scheme used in the above-defined, second mode. It is within the contemplation of this disclosure to provide sink devices and/or source devices that can be programmably configured to operate according to the first, conventional mode, the second wide-pipe and temporal multiplexing scheme mode and also in a third programmably selectable mode where the narrow-pipes and spatial multiplexing scheme of Ser. No. 12/014,341 is employed. Accordingly, an extended DPCD addressing scheme is disclosed which allows for selection of any of the three modes.

Other aspects of the disclosure will become apparent from the below detailed description.

BRIEF DESCRIPTION OF THE DRAWINGS

The below detailed description section makes reference to the accompanying drawings, in which:

FIG. 5A is a signaling timing diagram showing how four lanes of video signals may be packed and relayed daisy-chain style for response to by one or more identified display units with the system shown in FIG. 3; and FIG. 5B is a second signaling timing diagram showing how secondary data packing may be accomplished in accordance with the disclosure.

DETAILED DESCRIPTION

Figure 1A:
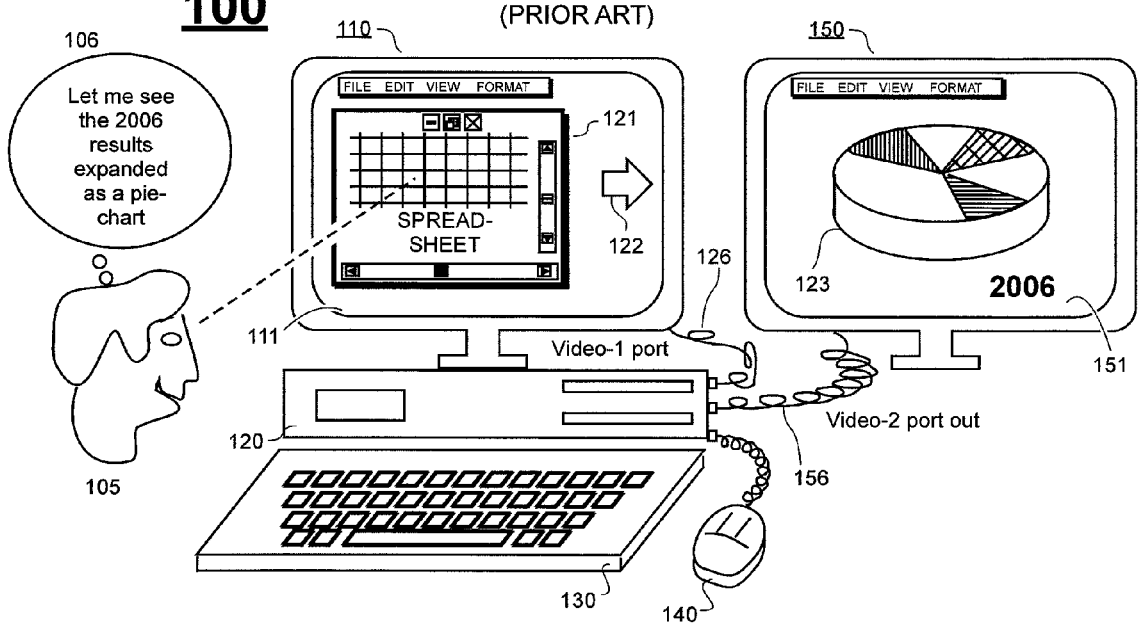
FIG. 1A is a block diagram of an exemplary environment where a user may want to employ an auxiliary display unit as well as a main display unit.

FIG. 1A is a block diagram of an exemplary multi-display computer system 100 in which a user 105 employs a main display unit 110 and an auxiliary display unit 150 both coupled to a desktop computer 120.

For sake of adding concreteness to the example, it is assumed in a first instance that the user 105 is a financial analyst who has a spreadsheet program executing within computer 120. The main display unit 110 has a first display area 111 of finite size within which one or more tabs of a detailed spreadsheet 121 are displayed. Upon studying a particular section of the spreadsheet 121, the user 105 decides that he wants to see a pie chart (or other focused) interpretation 123 of results belonging to one particular subsection of the spreadsheet 121 displayed separately in a new window. Unfortunately the finite display 111 of the main monitor is insufficient to accommodate both the enlarged focused view 123 that the user 105 wants to see and the already displayed spreadsheet 121 whose view the user does not want to lose. By clicking his mouse (140) over an appropriate on-screen icon 122, the user 105 instructs the computer 120 to display the expanded pie chart view 123 in the display area 151 of the auxiliary display unit 150. This will allow the user 105 to simultaneously view the spreadsheet 121 and the expanded pie chart view 123.

In response to the user's commands, the computer 120 generates the desired graphics data for the auxiliary image 123 and transmits that image data through an auxiliary video port and along the port's cable 156 to the auxiliary display unit 150. The auxiliary display unit 150 responds to the received video data (156) by displaying the expanded pie chart view 123 in its display area 151. As a result, the user 105 can continue to study details of the spreadsheet 121 as displayed on the main display unit 110 while simultaneously studying the graphic auxiliary results 123 displayed on the auxiliary display unit 150.

A problem occurs however, if the user 105 wishes to keep the large spreadsheet 121 displayed on the main display unit 110 while simultaneously viewing yet more expanded views like 123 on yet further auxiliary monitors. Firstly, the number of video output ports on the conventional computer 120 is generally limited to no more than two. In the case where the computer 120 is a desktop unit, there will be a main video port plug into which the jack of main video cable 126 is plugged and just one auxiliary video port plug into which the jack of an auxiliary video cable 156 is plugged. A plug-and-play detection circuit detects the optional attachment of the auxiliary monitor 150 and automatically configures the computer internal software to interact with the auxiliary monitor 150 (e.g., by reserving DRAM memory area for the graphics that is to be displayed on the auxiliary monitor).

In an alternate case (not shown), the user's computer 120 and keyboard 130 and main display unit 110 are integral parts of a laptop computer. In such a case, the main video port 126 is generally not available for user access and is provided only internally within the laptop while only one auxiliary video connector 156 is provided for optionally attaching the auxiliary display unit 150. Therefore, because of limited connector space available on such a laptop computer or on even smaller computers, it is not practical to add additional parallel video ports for supporting additional display monitors. Moreover, the circuitry for supporting each additional video output port 126, 156 is relatively expensive. Therefore it is generally impractical to keep adding further video output ports if the user 105 will not always be using them. Some computer users (not 105) never or hardly ever use an auxiliary display unit 150. Accordingly for such less sophisticated users it is economically impractical to provide multiple video output ports that will never be used and will merely consume space and add unnecessary cost to the system.

In yet another alternate case (not shown), the computer user 105 is sitting at a conference table with a large number (e.g., 20) of conferees who have their own monitors or their own laptop computers and the illustrated computer user 105 wishes for one of images 111 and 151 that appears on his monitors 110, 150 to simultaneously appear on the individual monitors or laptop computers of all the conferees (e.g., 20 of them, not shown) sitting around the table. In the past there was no economically feasible way to do so and instead, the user 105 would use a large scale optical projector to project onto a large common screen (e.g., a reflective movie projector screen) the image that he wishes all the conferees to see at one time. However there are instances where such a large scale optical projector is not readily available for use by the group and they must therefore proceed without benefit of shared easy viewing of the images (e.g., 111, 151) that the presenting user 105 wants to share with the numerous conferees (e.g., 20 of them sitting round a table, not shown).

Figure 1B:
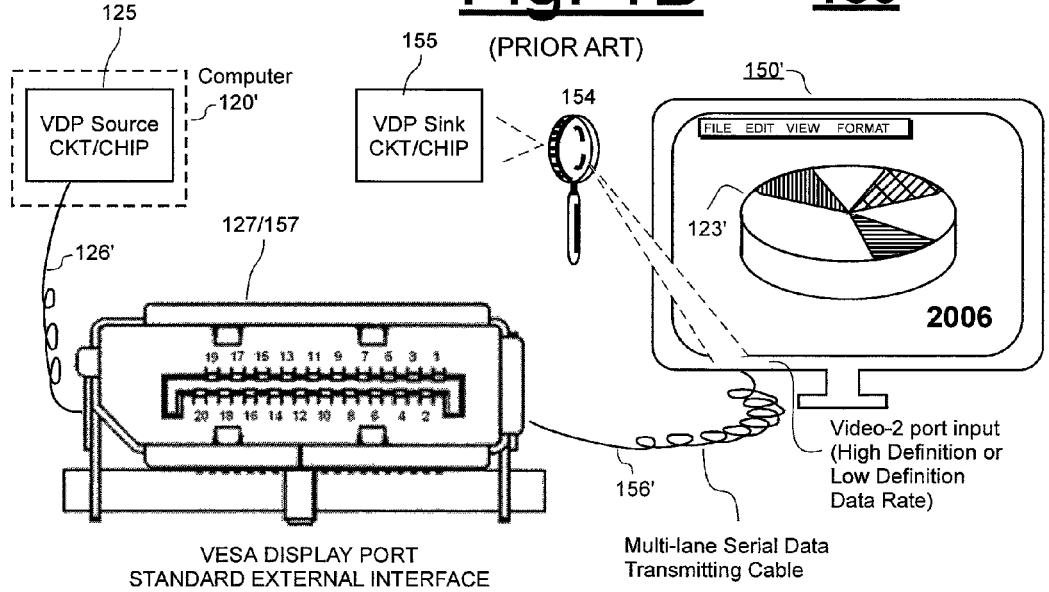
FIG. 1B is a schematic diagram showing an environment in which a VESA-DP serial transmission scheme is used for coupling a video signal to the auxiliary display unit of FIG. 1.

Referring to FIG. 1B, shown is a system 180 which employs a VESA Display Port interface. In accordance with the VESA protocol, the computer 120' includes a VESA Display Port source circuit or source chip 125 that couples to a VESA Display Port standard interface plug 127. A VESA-to-VESA connector cable (not explicitly shown) couples from the first VESA Display Port interface plug 127 to a second alike VESA Port interface plug 157 where the later interface plug 157 then connects (156') to a VESA-DP data sinking chip or circuit 155 provided within the auxiliary display unit 150'.

In accordance with the VESA DP protocol 1.1 the following pinouts are called for on the source-side VESA Display Port external interface plug 127:

TABLE 1

| Pin Number | Pin Name | Details |
| --- | --- | --- |
| Pin 1 | ML_Lane 0(p) | 'True' Signal for Lane 0 |
| Pin 2 | GND | Ground |
| Pin 3 | ML_Lane 0(n) | 'Complement' Signal for Lane 0 |
| Pin 4 | ML_Lane 1(p) | 'True' Signal for Lane 1 |
| Pin 5 | GND | Ground |
| Pin 6 | ML_Lane 1(n) | 'Complement' Signal for Lane 1 |
| Pin 7 | ML_Lane 2(p) | 'True' Signal for Lane 2 |
| Pin 8 | GND | Ground |
| Pin 9 | ML_Lane 2(n) | 'Complement' Signal for Lane 2 |
| Pin 10 | ML_Lane 3(p) | 'True' Signal for Lane 3 |
| Pin 11 | GND | Ground |
| Pin 12 | ML_Lane 3(n) | 'Complement' Signal for Lane 3 |
| Pin 13 | GND | Ground |
| Pin 14 | GND | Ground |
| Pin 15 | AUX_CH(p) | 'True' Signal for Auxiliary Channel |
| Pin 16 | GND | Ground |
| Pin 17 | AUX_CH(n) | 'Complement' Signal for Auxiliary Channel |
| Pin 18 | Hot Plug | Hot Plug Detect (HPD) |
| Pin 19 | DP_PWR Return | Power Return |
| Pin 20 | DP_PWR | Power Connector for connector cable |

It is to be noted that the above Table 1 shows the pinout for the source-side connector (127). The sink-side connector (157) pinout will have lanes 0-3 reversed in order, i.e. lane 3 will be on pins 1 and 3 while lane 0 will be on pins 10 and 12.

Figure 2:
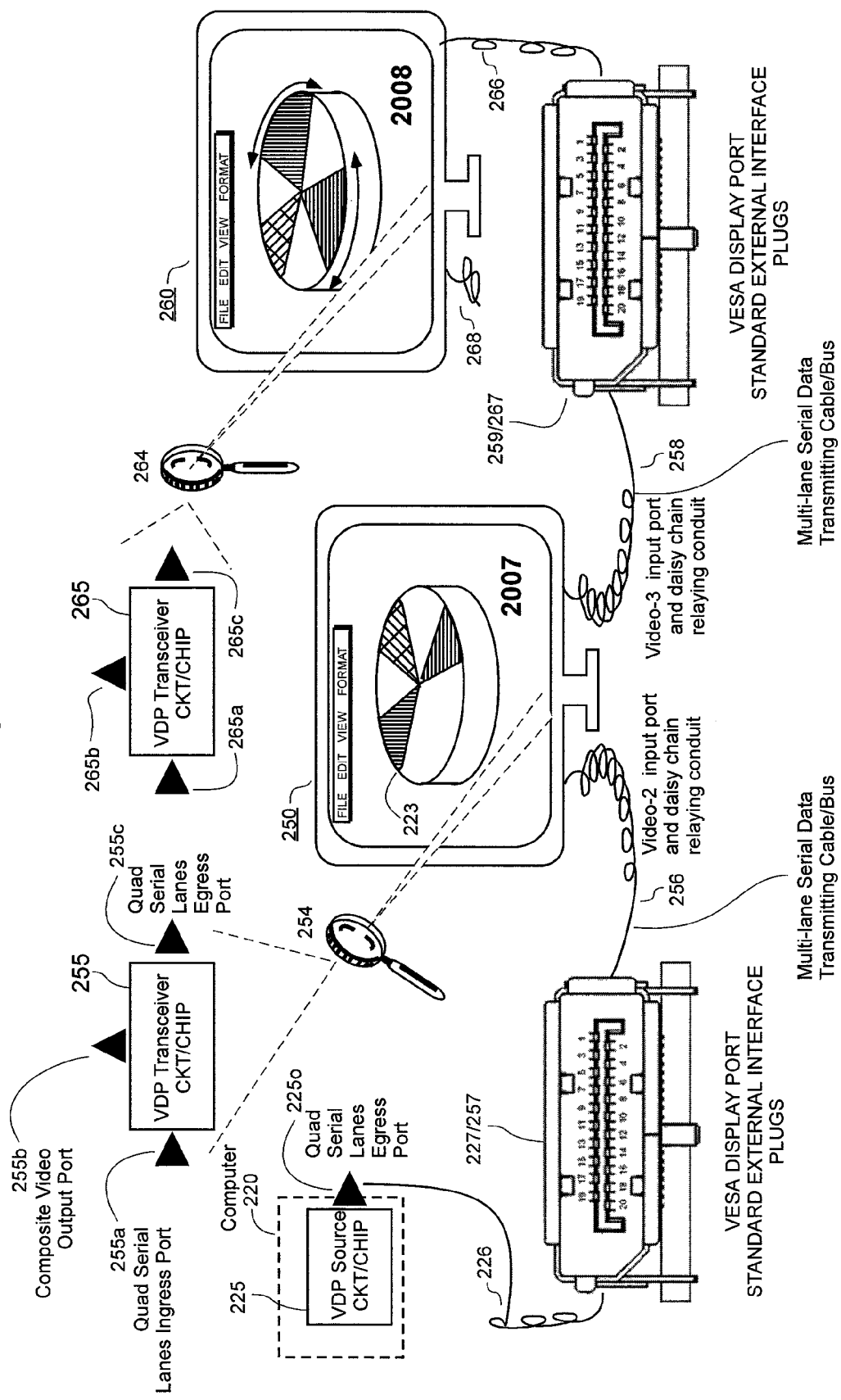
FIG. 2 is a block diagram showing a VESA-DP compatible display unit in accordance with the disclosure where the display unit comprises a VESA-DP compatible transceiver chip having a multi-lane serial input port, a daisy-chaining capable, multi-lane serial outputting and signal relaying port and a local display outputting port.

FIG. 2 is a block diagram of a video signal generating and display system 200 in accordance with the present disclosure of invention. Like reference symbols and numbers in the "200" century series are used for elements of FIG. 2 which correspond to but are not necessarily the same as the elements represented by similar symbols and reference numbers of the "100" series in FIG. 1B. As such, an introductory description of all elements found in FIG. 2 is omitted here and just the differences are described.

Unlike auxiliary monitor 150 of FIG. 1B which has just one video-sink connector 157 provided thereon, the auxiliary monitor 250 of FIG. 2 has two VESA-DP compatible connectors provided thereon: a video sinking and receiving connector 257 and a video outputting and relaying connector 259. Also provided within auxiliary monitor 250 (as indicated by magnifier symbol 254) and interposed between the VESA-DP compatible connectors 257 and 259 of monitor 250 is a first VESA-DP compatible transceiver circuit (or monolithic integrated circuit) 255. The VDP-compatible transceiver circuit/chip 255 is dynamically programmable to operate in a first mode as a conventional VESA-DP sink circuit (e.g., like 155 of FIG. 1B). However, the VDP-compatible transceiver circuit/chip 255 is dynamically programmable to instead operate in a second mode as a relay that relays to a second auxiliary monitor 260 (via the video outputting and relaying connector 259) the video data stream received by transceiver circuit/chip 255. Although not fully shown, it is to be understood that the first transceiver circuit/chip 255 operates as a three port data router having ports 255a, 255b and 255c. It receives a multi-lane VDP-compatible stream of input video data over a first port 255a thereof, it selectively deserializes input video data addressed to it and it causes the received video and deserialized video data to be output over to a second port 255b thereof (for example as composite RGB video signals) for display on the associated monitor 250, and it also relays the received video data (from port 255a) out over a third port 255c thereof to a corresponding first VDP-compatible receiving port 265a of a next in-chain VDP-compatible transceiver circuit/chip 265, where the latter is structured similar to 255 although the next-in-chain transceiver circuit/chip 265 may be programmed differently to respond to video data specifically targeted for that next-in-chain transceiver circuit/chip 265. It is understood of course, that the next-in-chain transceiver circuit/chip 265 may be further coupled to yet a next-in-chain transceiver circuit/chip (not shown) via connection 268 and so on.

Also, it is to be understood with regard to FIG. 2 that the illustrated configuration wherein each three-port VDP-compatible transceiver circuit/chip 255, 265 (whose placement is indicated by magnifier symbol 264), etc., is mounted inside its respective display unit 250, 260, etc., is not a necessary condition of the present disclosure. Each three-port VDP-compatible transceiver circuit/chip 255, 265, etc. may instead be mounted elsewhere, for example inside of a three connector junction box (not shown) where at least two of the three connectors are respectively a VESA-DP compatible video sinking and receiving connector (like 257) and a VESA-DP compatible video outputting and relaying connector (like 259). The third connector on the junction box (not shown) may be one that is compatible with the associated local monitor (250) and may or may not be a VESA-DP compatible video outputting connector. For example the third connector on the junction box (not shown) may be an RGB video composite outputting connector.

Moreover, it is to be understood with regard to FIG. 2 that the illustrated buses and/or cables 226, 256, 258, 266, 268 may not appear exactly as shown. The schematic representation is provided as such mostly as a short hand for avoiding the necessity of showing in detail all five VESA-DP connectors that would appear if the schematic was drawn in a less abbreviated form. It is to be understood that there is at least one VESA-DP source connector 227 on computer 220; there is at least one VESA-DP sink-and-relay connector 257 and at least one VESA-DP source-and-relay connector 259 on first monitor unit 250; and there is at least one VESA-DP sink-and-relay connector 267 and at least one VESA-DP source-and-relay connector (represented by 268) on second monitor unit 260. Accordingly, there is one VESA-DP compatible cable 226-256 between connectors 227 and 257. There is a second VESA-DP compatible cable 258-266 between connectors 259 and 267. There is a third VESA-DP compatible cable 268 which may optionally extend from second monitor 260 to a further signal receiving and/or relaying device in the daisy chain. Each source-and-relay connector like 259 and 268 supports hot-plug detection (HPD) so that the daisy chain may be extended or shortened on the fly as deemed appropriate by users. In one embodiment, as many as 254 monitors may be connected daisy chain style one to the next in this manner. (More generally, any relatively large number of monitors, e.g., 5 or more monitors can be simultaneously supported. If the MDID field is 8 bits long then the maximum is 256 although part of this address space, e.g., two or more addresses, may be reserved for special uses.)

Figure 3:
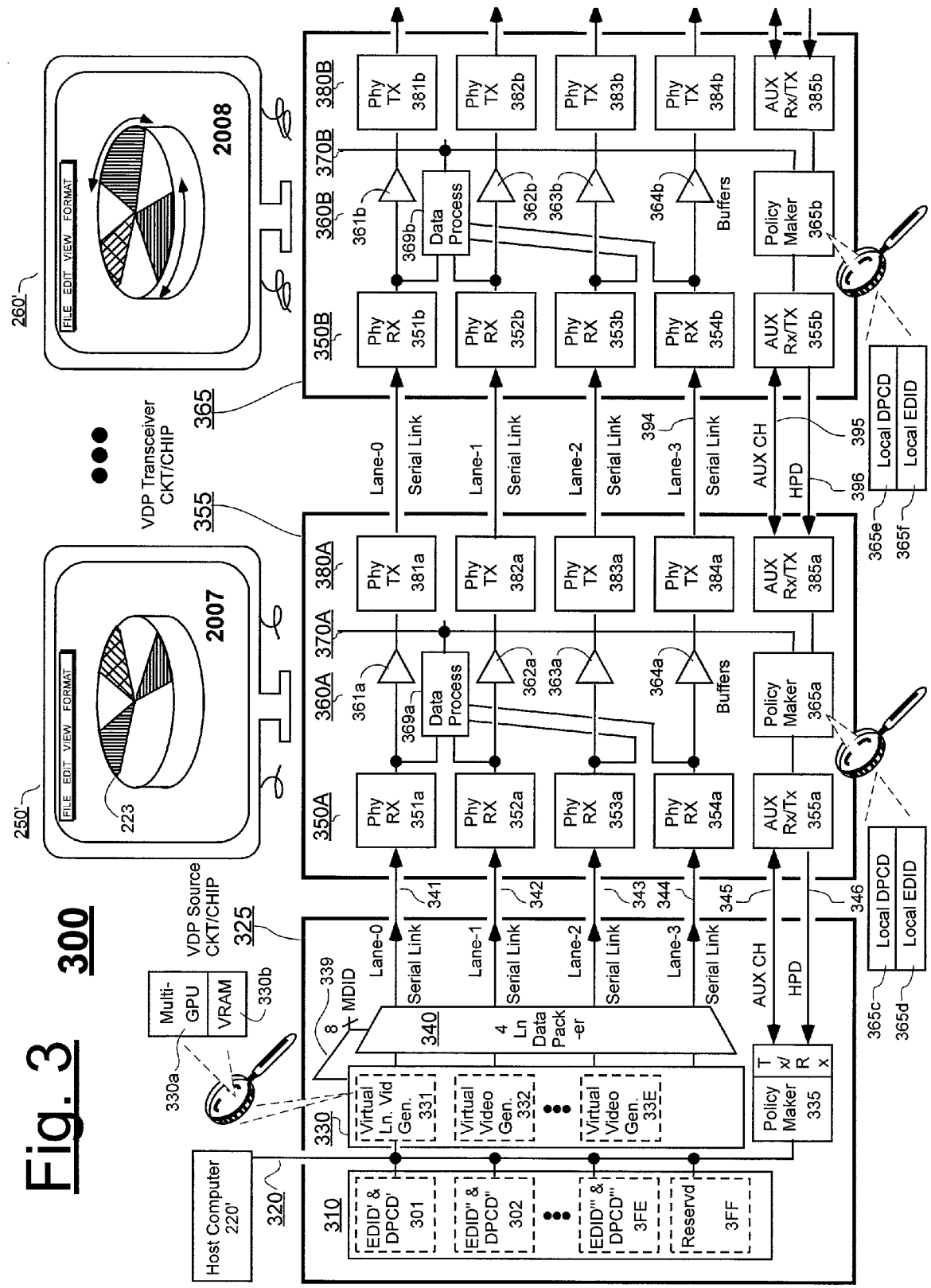
FIG. 3 is a schematic diagram showing a combination of a VESA-DP compatible source chip and a plurality of daisy-chain capable, VESA-DP compatible transceiver chips.

FIG. 3 provides a more detailed look at a system 300 in accordance with the disclosure. The system 300 includes a VESA-DP compatible video outputting circuit/chip 325 (a source device) and two VESA-DP compatible video transceiving circuits/chips 355 and 365 (sink devices) connected in daisy-chain fashion as shown. Each VDP-compatible transceiving circuit/chip (355 or 365) has four serial video data receiving units (351a-354a or 351b-354b) within it and one auxiliary control data transceiving unit (355a or 355b) within it. The four serial video data receiving units 351a-354a (or 351b-354b) each receives serialized lane data over a respective one of serial links 341-344 (or 391-394) and forwards the received lane data to an internal data processing unit (369a or 369b) as well as relaying the received lane data to a corresponding feedforward buffers/amplifier (361a-364a or 361b-364b). Although not explicitly shown, it is to be understood that buffers/amplifier (361a-364a or 361b-364b) may provide some amount of data delay buffering for the internal data processing unit (369a or 369b) so that the internal data processing unit can respond to certain control signals, including an MDID insertion flag and MDID signal described below (see 515 and 520 of FIG. 5A).

Figure 4:
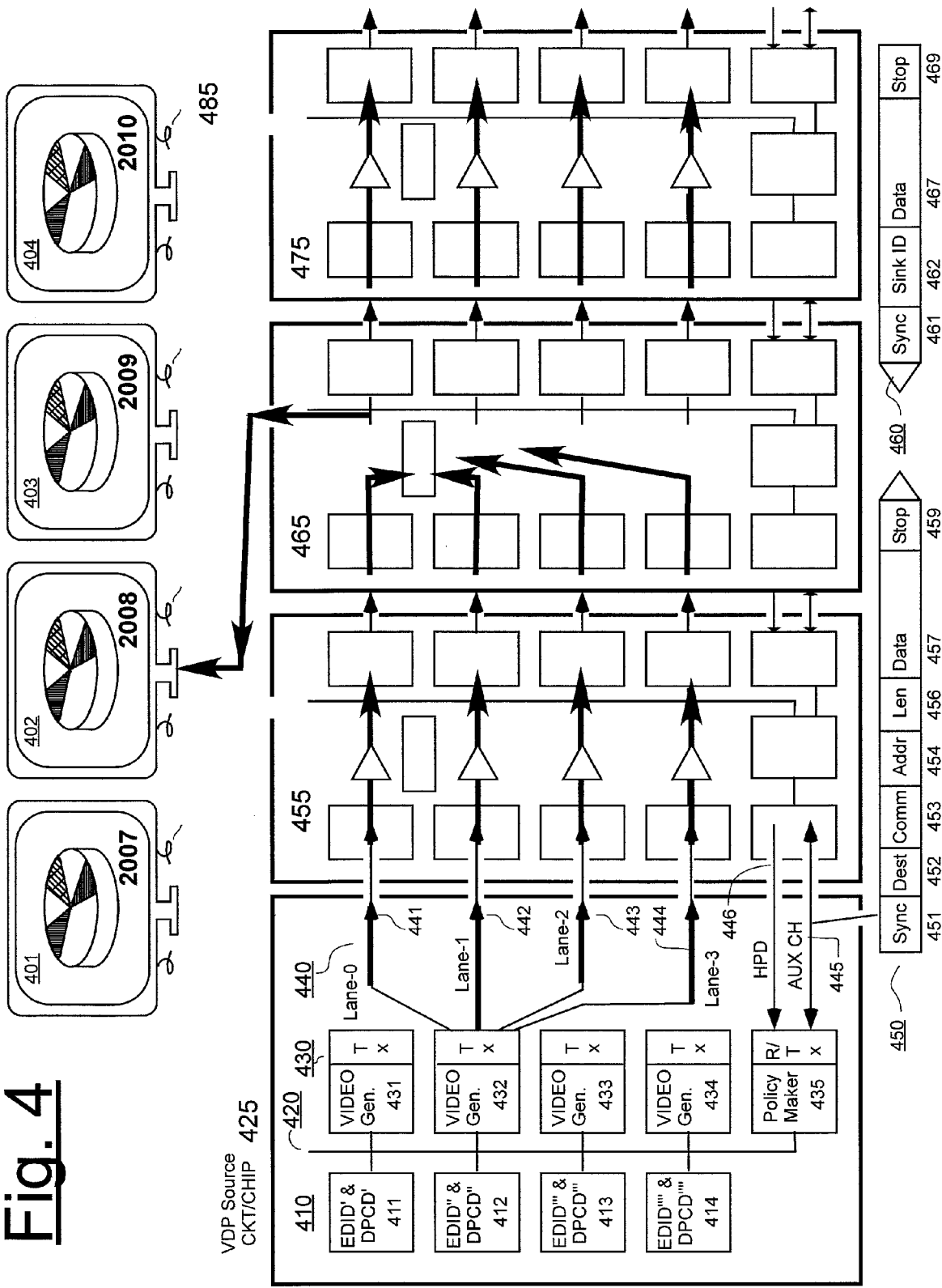
FIG. 4 is a signal flow diagram showing how image data may be picked up by an MDID addressed monitor within the system of FIG. 3.

Each internal data processing unit (e.g., 369a, 369b) is programmable to, among other things, automatically deserialize serialized video data received over a respective four serial data links (341-344 or 391-394), to unpack the packed video data, and to forward the deserialized unpacked video data up along a local interconnect bus 370A (or 370B) to the associated local display monitor 250' or 260' in a format usable by the local display monitor. When so-routing video data to an associated local display monitor, the internal processor (e.g., 369a, 369b) may unpack the data by combining and/or intermixing data from plural lanes (pre-aligned lanes) so as to form a composite video signal for output along vertical bus 370A (or 370B) to the local output port (255b or 265b of FIG. 2) and therefrom to the local display monitor. In one embodiment which is depicted in FIG. 4, serial data link lanes 0 to 4 carry adjacent video pixels or subpixels and the internal processor (e.g., 369a or 369b) unpacks the cross-lane distributed pixels/subpixels into a composite video stream that is formatted for display by the local display monitor (e.g., 250' or 260').

At the same time that passing-trough lane data is picked off selectively for optional display by the local display monitor (e.g., 250' or 260'), the feedforward buffers/amplifiers (361a-364a or 361b-364b) output the same four lanes of data via physical interface transmitters 381a-384a and along the next set of four serial data links (e.g., 391-394) for receipt by a next-in-chain serial video data receiving unit (e.g., 365). It is to be understood that the feedforward buffers/amplifiers (361a-364a or 361b-364b) may include variable delay modules for providing clock deskewing and lane alignment functions as shall be described in more detail below. It is to be understood that the feedforward buffers/amplifiers (361a-364a or 361b-364b) may provide signal delay support for the internal data processors (see time delays T1 and T2 of FIG. 5A) so that the internal data processors have time to detect matching MDID values and to pick up a copy of the associated video burst data (e.g., 530 of FIG. 5A) and/or of the associated audio burst data (e.g., 522 of FIG. 5A) and/or of the associated secondary data burst (e.g., 580 of FIG. 5B).

The auxiliary control data transceiving units (355a or 355b) of transceiving circuits/chips 355 and 365 each couples to a respective, sink-side policy-maker unit (365a or 365b) in the chip, where the latter operatively couples to the internal data processor (369a or 369b) via the local vertical bus (370A or 370B) of the chip.

Each of the VDP-compatible transceiver chips (355, 365) includes a local set of Display Port Configuration Data (DPCD) registers and EDID (Extended Display Identification Data) registers. More specifically, the local Display Port Configuration Data of a local monitor, say of monitor 250', is stored into the local (sink-side) DPCD registers 365c and local EDID registers 365d inside the policy maker 365a of the corresponding VESA-DP compatible video transceiving circuit/chip (e.g., 355). This local programming is the responsibility of the manufacturer of the local monitor (e.g., 250'). As understood by artisans skilled in the VESA-DP art, the VESA-compliant EDID data indicates physical attributes of the local monitor such as manufacturer, make and model as well as allowed ranges for reconfigurable features (e.g., current screen resolution) and default values for each. The VESA-compliant DPCD data indicates the current reconfigurable configuration of the monitor. Similarly, the policy maker 365b of the second VESA-DP compatible video transceiving circuit/chip and 365 includes its own locally programmed set of local DPCD registers 365e and local EDID registers 365f programmed with the information corresponding to local monitor 260'.

During system reboot or reset or a detected hot plug of a monitor, the local DPCD data (e.g., 365c, 365e) and EDID data (e.g., 365d, 365f) is copied from the local policy makers (e.g., 365a and 365b) into copy-holding memory areas 301-3FE of source circuit/chip 325. These copy-holding memory areas 301-3FE are referred to here as source EDID registers and source DPCD registers. In one embodiment, the memory module 310 which stores the source EDID registers data and source DPCD registers data is large enough to accommodate 255 unique ones of such register sets with respective address values 00hex to 0FEhex where value 0FFhex is reserved to indicate an invalid source EDID and invalid source DPCD register area. The respective, up to 255 source EDID register areas and source DPCD register areas are selectively accessible by a corresponding number of virtual video generators, 331, 332-33E. Each virtual video generator (e.g., 331-33E) can access its respective one of the source EDID registers data and source DPCD registers data and use the copied data therein for generating corresponding VESA-DP compatible video data. The copied EDID data and copied DPCD data are denoted with apostrophized suffixes. For example DPCD' and EDID' in virtual unit 301 was copied from local units 365c and 365d inside chip 355. DPCD" and EDID" in virtual unit 302 was copied from local units 365e and 365f inside chip 365 and so on. DPCD''' and EDID''' in virtual unit 3FE may have been copied from local register units inside yet another transceiver chip (not shown). As more specifically shown in FIG. 3, a first of the local DPCD and EDID register sets (365c, 365d) reside inside policy maker 365a of transceiving circuit/chip 355. A second of the local DPCD and EDID register sets (365e, 365f) reside inside policy maker 365b of transceiving circuit/chip 365 and so on. Once the local DPCD and EDID register data is copied over to the source chip 325, the virtual video generators 331-33E can access the data internally within source chip 325.

When one of the virtual video generators 331-33E generates a respective burst of video data (see 530 of FIG. 5A) for streaming out to a corresponding video monitor, the virtual video generator spreads (packs) the output burst essentially simultaneously over all of serial link lanes 341-344 so as to take advantage of the full transmission bandwidth available from serial links 341-344. In one embodiment, each link provides a bandwidth of at least about 2.7 Gigabits per second. In an alternate embodiment, each link provides a bandwidth higher than 2.7 GHz, e.g., 3.5 GHz or 5.0 GHz or greater. Collection of the video output burst and its distribution across serial link lanes 341-344 is carried out by a 4-lane data repacker unit 340. In addition to repacking the video output burst (e.g., 530 of FIG. 5A) of a given virtual video generator out across the four lanes, the data repacker unit 340 inserts a MultiDevice identification number signal, or MDID signal 339 into the bit stream bursts of serial lanes 341-344. See more specifically, row 520 of FIG. 5A where it is shown that the 8-bit MDID signal is replicated in each of the four lanes at a time point that is delayed T1 from an MDID-insertion flag located in row 514. This MDID signal 339/520 is sampled by data processor units 369a, 369b, etc. to determine if the associated, passing-through video output burst (e.g., 530 of FIG. 5A) is targeted for display by the corresponding local monitor (e.g., 250', 260'). If the burst is so targeted for the corresponding local monitor, the data processor unit (e.g., 369a, 369b, etc.) in the transceiving circuit/chip (e.g., 355, 365, etc.) will capture a copy of the passing through data and generate a corresponding local composite signal from the captured copy (buffered copy) of the passing through video output burst and it will forward the composite signal towards the associated local monitor (e.g., 250', 260', etc.) for display or other appropriate use.

In one embodiment, matching of the passing-through MDID value (e.g., 520 of FIG. 5A) with a local MDID value (e.g., My_MDID) is implemented in the local sink processor (e.g., 369a of FIG. 3) in a relatively straight forward manner such as follows: IF (MDID_Insert_Flag_Bit=True) AND (Passing-through_MDID=My_MDID) THEN Capture_Passing-through_Data ELSE Ignore_Passing-through_Data. In this simple implementation, the variable MDID_Insert_Flag_Bit corresponds to bit 7:7 of VBID byte 515 in FIG. 5A or VBID byte 565 in FIG. 5B. The Passing-through_MDID variable corresponds to a byte in row 520 of FIG. 5A or in row 570 of FIG. 5B. The Passing-through_Data that is to be copied (captured in a local buffer) and locally processed corresponds in FIG. 5A to one or both of audio block data 522 in each of the corresponding four lanes and video block data 530 in each of the corresponding four lanes, and corresponds in FIG. 5B to one or both of secondary block data 580 in each of the corresponding four lanes and video block data 510' in each of the corresponding four lanes.

In an alternate embodiment, matching of the passing-through MDID value (e.g., 520 of FIG. 5A) can be with any of a predetermined number of local MDID values; for example: IF (MDID_Insert_Flag_Bit=True) AND (Current_Line_Count≦My_MAx_Line_Count) AND ((Passing-through_MDID=My_MDID) OR (Passing-through_MDID=254) OR (Passing-through_MDID=250)) THEN Capture_Passing-through_Data ELSE Ignore_Passing-through_Data. Here, capture occurs if the Passing-through_MDID byte (e.g., in row 520 of FIG. 5A) matches any one of the locally set values (or set by the source device after hot plug-in) of 254, 250 and My_MDID, where the last one is typically different from the other two. The My_MAx_Line_Count value defines a maximum number of video lines that can be displayed by one frame on the local monitor while the Current_Line_Count variable keeps count of the number of lines already accumulated for the current frame. In such a case, the source device can multicast common video or other data simultaneously to a plurality of daisy chain connected monitors and thereby make more efficient use of the limited bandwidth available on the daisy chain. Typically the multicast video data will be presented as a successive set of video lines to form a picture band in the overall displayed picture. In one embodiment, such an operation finds use in a central video displaying station of a multi-camera security system. Each monitor is required to display the current date and time on a top band thereof. Accordingly, the source device multicasts this data under a globally shared MDID value, say the 254 value of the above example. Then each monitor is required to display the general building location of the camera (say "Parking Garage Level 3") in a next lower picture band of the displayed image. Accordingly, the source device multicasts this data under a subset-shared MDID value, say the 250 value of the above example. Finally, each monitor is required to display the specific camera number and associated live video from that camera in the next lower picture band of the displayed image. Accordingly, the source device unicasts this data under the specific uniquely assigned local identification number, My_MDID, assigned to that one camera. This is just one example. Another example may be where rows of a spreadsheet are displayed across plural ones of daisy chain connected monitors and one band of rows is common to all monitors or to a subset of two or of the monitors.

Referring to FIG. 3, in one embodiment, each of the virtual video stream generators (331-33F) is implemented on a time shared multitasking basis by a multitasking graphics processor unit (GPU 330a) and an associated video SRAM memory block (e.g., 330b). The video SRAM memory block (e.g., 330b) receives raw video data from host computer 220' by way of bus 320. The corresponding GPU time slice (e.g., 330a) references a corresponding source EDID/DPCD register set (e.g., 301), which register set is identified by the MDID signal 339; and the corresponding GPU time slice then uses the referenced EDID/DPCD data to determine how to transform (e.g., repack) the raw video data into monitor compatible video data for output as a burst across serial links 341-344 with the assistance of data repacker unit 340. In addition to storing the corresponding source-side, copied DPCD & EDID data 301-3FE, the source chip's storing unit 310 may further store machine instructions for causing the corresponding GPU time slice (e.g., 330a) to execute desired ones of predefined programs. Alternatively or additionally, GPU execution software may be stored in a shared other memory space (not shown) of the VDP source circuit 325 and/or in the host computer 220'. As mentioned, the host computer 220' downloads video data that is to be displayed by one or more of the active monitors (e.g., 250', 260') into the respective VRAM block areas (e.g., 330b) of generator unit 330 and then the corresponding GPU time slice (331-33E) takes over and further process the downloaded video data in accordance with current configuration information provided in the associated DPCD & EDID storing area (e.g., 301) as identified by an associated MDID signal 339 so that processed video data is made compatible with the specific protocols of the destination monitor (e.g., 250' or 260'). The repacker 340 then serializes the respectively processed video data and transmits it out as a four-lane wide serial burst on all of output links 341-344. Scheduling for each output burst (when and targeted to which monitor) is handled by the source chip policy maker unit 335. It is within the contemplation of the disclosure that not all of links 341-344 need be active for outputting a video data burst. If one of the links goes down, the repacker 340 may attempt to make do with just 3 lanes rather than 4. The corresponding bandwidth or resolution of the receiving monitor(s) may have to be diminished in such a case though. Alternatively, reduction from 4-lane wide burst mode to 3-lane wide burst mode (or even down to 3-lane wide burst mode) may be carried out to reduce power consumption in cases where the monitors on the daisy chain are low resolution rather than high resolution monitors and as such, maximum transmission bandwidth is not required.

Additionally, although the example of FIG. 3 shows the simultaneous use of four serial lanes for serially bursting video data in a daisy chain fashion from source chip 325 to and through the downstream transceiving circuits/chips 355, 365, etc., where the output bursts roughly comport with current VESA-DP protocol requirements (but see the exceptions at 515 and 520 in FIG. 5A), it is within the contemplation of the disclosure to alter this number of simultaneously used serial lanes and to provide for a greater number of video streaming lanes (e.g., 6, 8, 10, etc.) in each of chips 325, 355 and 365 or even a fewer number of video streaming lanes (e.g., just three) as may be deemed appropriate by system designers. For example, source chip 325 might be designed to contain an eight (8) lane wide repacker instead of the illustrated 4-lane packer 340. Such an 8-lane repacker (not shown) may be able to simultaneously support two VESA Display Ports of 4 lanes each (or to integrally support an 8-lane port protocol) for burst outputting of video data. At the same time, the sink side transceiver chips 355-365 may continue to contain only enough circuitry for supporting 4 lanes each of received burst data, although with MDID addressing means and packet addressing means sufficiently wide for distinguishing amongst a larger number of potential targets. In such an alternate case, the source chip will drive two daisy chains that are each 4 lanes wide. (The meaning of the packet addressing means will be become clearer below when the destination ID field 452 of AUX CHAN packet 450 in FIG. 4 is described.) Moreover, even though FIG. 3 shows each virtual video stream generator (e.g., 331) as potentially using a time slice out of multitasking GPU 330a, it is within the contemplation of the disclosure to allow each video stream generator (e.g., 331, 332, etc.) to have its own dedicated GPU and its own dedicated VRAM block. The shared or dedicated video data processing resources may be ones other than general purpose GPU's (e.g., ASIC style video processor circuits) and the video data storage resources may be ones other than SRAM style video memory (e.g., video speed DRAM memory).

During system reboot or reset or re-configuration, the presence of the more downstream, second local monitor 260' and the presence of its VDP Transceiver chip 365 within the daisy chain is signaled by hot plug detection line 396 to policy maker 365a in the first VDP Transceiver chip 355. In accordance with VDP protocol, the HPD line 346 toggles low for a predetermined time (e.g., 2 ms or greater) and then generally back high so as to signal any one of three events, namely, a hot plug-in event, a hot un-plug event, and an interrupt request (IRQ) by a sink device. During boot-up, the first VDP Transceiver chip 355 signals its presence on the daisy chain by toggling HPD line 346. The second VDP Transceiver chip 365 similarly signals its presence on the daisy chain by toggling HPD line 396. In response, the first VDP Transceiver chip 355 automatically relays the toggled signal upstream to the source policy maker 335 in the VDP source chip 325 by again toggling the HPD line 346. As the hot-plug terminology implies, each additional VDP Transceiver chip (e.g., a third one after 365) may be hot-plug connected to the downstream end of the daisy chain or unplugged from the daisy chain and may signal its added presence as a powered up and active member of the daisy chain or as an unplugged device by the relaying of a respective toggling of the local hot plug detection line (HPD) through the next upstream one in the chain of VDP Transceiver chips until the toggle signal reaches HPD input line 346 on the source device 325. Then, in response to such togglings of the HPD input line 346, the source device 325 sends status inquiry packets (see 450 of FIG. 4) over the auxiliary channel lines (AUX CH) 345 for relaying to the addressed one (see Destination field 452 of FIG. 4) of the downstream VDP Transceiver chips. If a new VDP Transceiver chip has been added on to the daisy chain by way of hot plugging, it will respond to the status inquiry by returning its local DPCD (e.g., 365e) and local EDID (e.g., 365f) data in the response packet (see 460 of FIG. 4) that is relayed upstream over the auxiliary channel lines until the information arrives in the source policy maker 335. The illustrated source chip 325 can have a maximum of 255 VDP Transceiver chips coupled to it in daisy chain connection style with each of the 255 VDP Transceiver chips (not shown) consuming a respective one of 255 unique MDID values. In the illustrated example 300 of FIG. 3 there are only two VDP Transceiver chips activated and coupled in daisy chain connection style to the source chip 325. The first VDP Transceiver chip 355 consumes source serial link lanes 0 through 4 for a first set of time slices while the second VDP Transceiver chip 365 consumes the same source serial link lanes 0 through 4 during alternating second time slices. The amount of sliced time allocated to Transceiver chip 355 versus 365 may be varied based on the current resolution needs of the corresponding local monitors 250' and 260'.

In order to support the above described copying and relaying of DPCD data and EDID data, certain supplemental changes should be made to the standard VESA Display Port specification as set forth below.

2.1 Supplemental Display Port Configuration Data (DPCD) Registers

The VESA-DP 1.1 specification defines the functionality of certain control register addresses while leaving others as unused and reserved for future expansion. Among the reserved register space addresses are addresses 00300(hex)-00303(h) and 00400(hex)-00411(h) which the present disclosure proposes to adapt for supporting the video data daisy chaining operations described both herein and in the above-cited (and here incorporated) U.S. application Ser. No. 12/014,341 filed Jan. 15, 2008 by Jechan Kim. Note that some of these register addresses are used only for implementations according to U.S. application Ser. No. 12/014,341 where each lane may operated independently, some of these register addresses are used only for implementations according to the present application wherein daisy chained video data is sent as packed burst across all four lanes (or a lesser number of lanes if one lane is down for example), and some of these register addresses are shared by both implementations. Specific addresses may of course vary. It is to be understood that is the present proposal for reserved address allocation conflicts with an industry adopted or other allocation that the here proposed register addresses can be changed to avoid the conflict as may be appropriate. In one embodiment, in order to support the optional daisy chain enabling features of both U.S. application Ser. No. 12/014,341 and the present application, the following new DPCD register definitions are used in the source specific DPCD fields (301-3FE) of the modified source device (325) as well as in the sink-side specific DPCD fields (365c, 365e) of the transceiver units (355, 365).

TABLE 2

Added DPCD Source-Specific Fields
Source Specific Fields

| | | |
|---|---|---|
| 00300h | OUI 7:0 (First 8 bits of Organized Unit Identification) | Read/Write |
| 00301h | OUI 15:8 | Read/Write |
| 00302h | OUI 23:16 | Read/Write |
| 00303h | DAISY_CHAIN_SUPPORT_0<br>Bits 1:0 = DAISY_CHAIN_SUPPORT MODES<br>00 = Don't support extended AUX_CH syntax, but instead remain in conventional VESA-DP MODE<br>01 = Support extended AUX_CH syntax to daisy chain in accordance with Ser. No. 12/014,341 (spatially multiplexed lanes)<br>10 = Support extended AUX_CH syntax to daisy chain in accordance with wide-pipe MDID targeting scheme disclosed here<br>11 = Reserved.<br>Bits 7:2 = RESERVED. Read all 0's.<br>** This register is used by both Ser. No. 12/014,341 and by this application | Read/Write |

TABLE 3

Added DPCD Sink Specific fields
Source Specific Fields

| | | |
|---|---|---|
| 00400h | OUI 7:0 (First 8 bits of Organized Unit Identification for VDP transceiver unit) | Read/Write |
| 00401h | OUI 15:8 | Read/Write |
| 00402h | OUI 23:16 | Read/Write |
| 00403h | Bits 1:0 = DAISY_CHAIN_SUPPORT MODES (in sink devices)<br>00 = Don't support extended AUX_CH syntax, but instead remain in conventional VESA-DP MODE<br>01 = Support extended AUX_CH syntax to daisy chain in accordance with Ser. No. 12/014,341 (spatially multiplexed lanes)<br>10 = Support extended AUX_CH syntax to daisy chain in accordance with wide-pipe MDID targeting scheme disclosed here<br>11 = Reserved.<br>Bits 3:2 = RESERVED. Read all 0's.<br>** Above Bits 3:0 of this register are used by both Ser. No. 12/014,341 and by this application.<br>Bits 5:4 = This SINK_DEVICE_ID<br>00 = sink id 0<br>01 = sink id 1<br>10 = sink id 2<br>11 = sink id 3<br>** Above Bits 5:4 of this register are used as stated when the sink device is in the spatial lane multiplexing mode of Ser. No. 12/014,341<br>Bits 7:6 = RESERVED. Read all 0's.<br>** This register is used by both Ser. No. 12/014,341 and by this application as indicated above. | Read/Write |
| 00404h | DAISY_CHAIN_SUPPORT_1 (for independent lanes)<br>Bits 3:0 = IN_ACTIVE_LANES<br>Each bit corresponds to a respective lane ID.<br>For example, 0011h means lane 0 and 1 are active to receive incoming video.<br>Bits 7:4 = OUT_ACTIVE_LANES<br>Each bit corresponds to respective lane ID for video data being relayed further downstream.<br>For example, 0011h means lane 0 and 1 are active.<br>** This register is used by Ser. No. 12/014,341, but left as all 0's by this application | Read/Write |
| 00405h-0040Fh | Reserved: read as all 0's | Read |
| 00410h | DAISY_CHAIN_SUPPORT_2 (for burst-packed lanes)<br>Bits 7:0 = MDID<br>** This register is used in accordance with this application, but to be left as all 0's by implementation configured according to Ser. No. 12/014,341 | Read/Write |

TABLE 3-continued

Added DPCD Sink Specific fields
Source Specific Fields

| | | |
|---|---|---|
| 00411h | DAISY_CHAIN_SUPPORT_3 (for burst-packed lanes)<br>Bits 3:0 = IN_ACTIVE_LANES<br>Each bit corresponds to a respective lane ID.<br>For example, 0111h means lanes 0, 1 and 2<br>are active to receive incoming video and relay it out while<br>lane 3 is inactive (e.g., powered down).<br>Bits 7:4 = OUT_ACTIVE_LANES<br>Each bit corresponds to respective lane ID for<br>video burst data that is being relayed further downstream.<br>For example, 0111h means lanes 0, 1 and 2<br>are active to receive incoming video and relay it out while<br>lane 3 is inactive (e.g., powered down). Typically, bits 7:4<br>will be set to 1111h and bits 3:0 will also be set to 1111h<br>** This register is used in accordance with this application,<br>but to be left as all 0's by implementation configured<br>according to Ser. No. 12/014,341 | Read/Write |

Additional Explanations
DAISY_CHAIN_SUPPORT Modes: Bits 1:0 of DPCD 00303h and 00403h
This 2-bit user-programmable field (in registers at 0303h or 0403h) indicates whether the respective source or sink device's daisy chain supporting capability is turned on or off, and if so whether the spatial multiplexing scheme of U.S. Ser. No. 12/014,341 is being used or the time-multiplexed, MDID targeted scheme disclosed here is being used. When this 2-bit field of a source device is set to logic '10', the corresponding source device (e.g., 325) is switched into a mode capable of supporting up to 255 independent and time interlaced Display Port video data bursts (provided the MDID field is 8 bits long) heading downstream out of the source unit (e.g., 325) with each video burst occupying, for example all 4 lanes (341-344) for a given time slice and including video and secondary data that can be picked up by downstream sink devices having matching MDID identifications where the data is transmitted in daisy chain, forward-relaying fashion. Also the source device (e.g., 325) is switched in this mode to support extended AUX_CH transactions such as ones described in below section 2.2.

When the Bits 1:0 of DPCD address 00403h is set to logic '10' in a sink-side device, the sink device is switched into a mode that supports the sink-circuit portion of the time interlaced Display Port video data burst mode using the extended AUX_CH transactions described below.

SINK_DEVICE_ID: Bits 5:4 of DPCD Location 00403h
This register is used by implementations in accordance with Ser. No. 12/014,341, but left as all 0's when the burst-mode time multiplexing scheme (MDID scheme) of this application is active. As will be detailed, auxiliary channel messages are sent as packets with destination indicators when the daisy chain supporting mode is turned on. See for example FIG. 4 where the structure of a packet output by the source unit 425 is shown at 450 and the structure of a response packet output by the responding sink device is shown at 460. For implementations in accordance with Ser. No. 12/014,341 bits 5:4 of DPCD location 00403h in the sink-side device (e.g., 455, 465 or 475) define the sink device identification within the given daisy chain in the range of just 0-3. In the case where there is a maximum of four unique sink-side devices allowed in the chain, the id value is in range of 0 to 3 inclusive. This sink device ID field may be used by the sink-side device to determine if it should respond to a transaction request packet 450 issued by a source device (e.g., 425) over the AUX_CH channel 445 when an embodiment according to Ser. No. 12/014,341 is used. When upon detecting a match of ID values in such a case, a sink device does respond, it copies the sink device ID value stored in location 00403h of its local DPCD registers into the ID field 462 of the response packet 460. The response packet 460 is relayed back to the request-issuing source device (e.g., 425) over the AUX_CH channel 445 by way of whatever number of intervening transceiver devices (e.g., 455, 465, 475) are present on the daisy chain.

SINK_DEVICE_ID: Bits 7:0 of DPCD Location 00410h
This register is used by MDID-keyed implementations in accordance with this application, but left as all 0's by configurations such as in accordance with Ser. No. 12/014,341. As will be detailed herein, up to 255 separate transceiving circuits/chips (455-475, etc.) may be supported with each one being assigned a different 8-bit MDID identification value, or optionally with one or more of them sharing a same MDID value.

IN_ACTIVE_LANES and OUT_ACTIVE_LANES of DPCD location 00404h: This register is used by implementations in accordance with Ser. No. 12/014,341, but left as all 0's by embodiments such as in accordance with the MDID-keyed scheme of this application. The data stored in DPCD location 00404h of each sink-side device (e.g., 455, 465 or 475) defines which of the independent ingress lanes and which of the independent egress lanes of its sink-side device are active. In one embodiment, ingress-to-egress lane mapping (where such mapping is disclosed in Ser. No. 12/014,341) is defined on the basis of the number of active ingress lanes and active egress lanes. By way of example, in FIG. 4, sink device 465(B) may be programmed to indicate that the first three of its ingress lanes are active and just two the first two of its egress lanes are active. As a result, the per-lane video streams are routed (remapped) through device 465(b) in accordance with the mapping schemes of Ser. No. 12/014, 341.

IN_ACTIVE_LANES and OUT_ACTIVE_LANES of DPCD location 00411h: This register is used by MDID-keyed configurations in accordance with this application, but should be left as all 0's by implementations in accordance with Ser. No. 12/014,341. Typically, bits 7:4 will be set to 1111 h and bits 3:0 will also be set to 1111 h so that all four lanes are used for burst mode data relaying at the maximum bandwidth of the available serial links. However, it is within the contemplation of this disclosure that a serial link may become defective or that system designers may want to optionally reduce power consumption by selectively shutting one lane down. As such, this register allows selective deactivation of lanes in some embodiments. For example, a setting of 0111 h for each quartet of control bits may means lanes 0, 1 and 2 are active to receive/output video data while lane 3 is inactive (e.g., powered down).

2.2 Extended AUX_CH Request/Response Transaction Syntax:

Still referring to FIG. 4, since a source device (425) can send different video streams to as many as 255 different sink devices in the daisy chain (according to the present disclosure; or to as many as 255 different sink devices according to Ser. No. 12/014,341), the standard VESA-DP AUX_CH handshaking protocol is modified to include (to insert) a destination identifying byte 452 in output transaction requests 450 when the supplemental extended mode is active. Such a modified packet 450 is shown in FIG. 4. In one embodiment, all eight bits of the destination byte 452 are used to identify the targeted sink device which is to respond to the transaction request packet 450 by copying a corresponding MDID value into that destination byte 452. The rest of the transaction request signal remains the same as in standard VESA-DP AUX_CH handshaking. Byte 451 is the transmission synchronization field and is used for clock recovery as well as signaling the start of the transaction request signal. In one embodiment, each transceiver device (455, 465, 475) is assigned a unique synchronization symbol but only the synchronization symbol (451) used on lane 0 (441) is used for generating a reference clock signal to which the all the transceiver devices (e.g., 455, 465, 475, etc.) will synchronize their local clocks to. The reference clock signal is then used for time wise aligning video signals on packed together ones of the plural serial linking lanes.

Byte 453 of the extended transaction signal 450 contains a coded command in least significant bits 3:0 thereof and target address bits 19:16 in the upper half of the byte. Field 454 is 2 bytes long and contains respective target address bits 15:8 and 0:7 in its upper and lower halves. Bits 7:0 of the Length byte 456 specify payload length. The payload data is held in field 457 and the end of packet or stop byte occurs at 459.

In the corresponding response packet 460 from the responding sink-device, a one byte, Sink_ID field 462 is added after the lane-specific synchronization byte 461. In one embodiment, all eight bits of the sink_ID byte 462 are used to identify the responding sink device which is respond to a transaction request packet, where the sink_ID is the same as the MDID value assigned to the sink device. In the case where a same MDID value is assigned to two or more sink devices, it is the responsibility of the most upstream of the MDID-sharing sink devices to respond on behalf of all of the MDID-sharing sink devices. One or more DPCD bits may be reserved and used for indicating which of the MDID-sharing sink devices is the most upstream one.

3.0 Source Device Requirements: In order to support the daisy chain expansion features, a source device (e.g., 425) in accordance with the disclosure should be designed to support below the following aspects: (1) Comport with the new DPCD source specific fields (as defined in above Section 2.1); (2) support the Extended AUX_CH syntax (as described above) as well as the original native VESA-DP AUX_CH syntax; (3) Support the burst output of at least 4 packed serial links from a given virtual or nonvirtual video burst generator (e.g., 432); (4) Be able to copy into itself or otherwise responsively manage up to 255 local EDID and DPCD register sets (see 365c, 365d of FIG. 3) for the corresponding, up to 255 daisy chainable sink devices; and (5) include a Programmable timer for handling the extended AUX_CH transactions as described below.

4.0 Sink Device Requirements: To support daisy chain features described herein, in one embodiment, each sink device (e.g., 455) should be able to support the following enumerated aspects: (1) Be capable of setting a sink device id matching a predetermined MDID value either in response to manually established specifications (e.g., a rotary or panel button on the local monitor) or automatically (e.g., in response to pre-loaded EDID data); (2) Comport with the new DPCD sink specific fields (as defined in above Section 2.1); (2) Support the Extended AUX_CH syntax (as described above) as well as the original native VESA-DP AUX_CH syntax; (3) Support pass through of at least 4 parallel stream of packed-together video data when asked to function as a pass-through device and/or to support pick up and local display of passing-through video streams when the streams are targeted by an accompanying MDID signal (see 520 of FIG. 5A) for the current sink; (4) Provide an extended and native AUX_CH transaction generator/processor (policy maker) for interacting with the next downstream sink device along the daisy chain; (5) Relay HPD toggle signals generated from downstream sink device to upstream sink devices or to the upstream source device (425).

5.0 Transaction Details

AUX_CH Transactions

Once the DAISY_CHAIN_SUPPORT field is set, the source device (e.g., 425) will use the Extended AUX_CH syntax including DEST_ID field to generate transactions in place of the standard native VESA-DP AUX_CH syntax. In one embodiment, sequential MDID values (e.g., 0, 1, 2, 3, . . . 254) are assigned sequentially in a downstream direction along the daisy chain and the following process is employed:

Step 1: The source device (e.g., 425) generates and outputs an AUX_CH write/read request transaction using DEST_ID=1 from its AUX_CH line (e.g., 445) and starts an internal response time-out timer whose time-out value is greater than that used by the timer for native AUX_CH exchanges (this being because it can take more time to relay the transaction request signal 460 downstream to the targeted transceiver device (e.g., 485) and more time to relay the response upstream through intervening ones of the transceiver devices).

Step 2: The first sink device along the daisy chain (e.g., 455 whose Sink ID or MDID is 0) receives this transaction request packet (450) and checks the DEST_ID field (452) to see if the packet is destined for the present sink device or destined for others. If DEST_ID is different from its id, the present sink device (e.g., 455) relays the request downstream by generating and outputting a new AUX_CH write/read transaction request packet and starts its internal time-out timer.

Step 3: The next sink device along the daisy chain (e.g., 465 whose Sink ID is 1) receives the transaction request packet output by the more upstream sink device (455) and checks to see if the DEST_ID field 452 in this second transaction request packet matches its id. If it matches its id, the next sink device (e.g., 465) performs the commanded write or read of its corresponding local DPCD register and sends the AUX_CH response transaction packet 460 back upstream along the AUX CH chain with the Sink_ID. field 462 set equal to the DEST_ID of the responding sink device (e.g., 465).

Step 4: The next upstream sink device (e.g., 455) receives the response transaction packet from the responding sink device (e.g., 465) and repeats Step 3 while at the same time stopping its internal timeout timer. Then the upstream sink device (e.g., 455—having sink ID 0) forwards the response transaction to the source device 425 while similarly stopping its internal timeout timer.

Step 5: The source device (425) receives the relayed response transaction packet 460 and responsively stops its internal timeout timer. The source device may then relay the received data 467 to an appropriate DPCD/EDID storing memory area (e.g., 411-414) in the source device for use by the corresponding internal GPU (e.g., 431-434) and/or for upload to the host computer (e.g., 220' of FIG. 3).

5.2 Hot Plug Detection 5.2.1 Single source device and single sink device: In this case, the HDP detection process is the same as the native VESA-DP HPD process where the HDP line toggle is detected directly on HDP line 446 of FIG. 4 for example.

5.2.2 Single source device and two sink devices: In this case, the following HDP toggle relaying process is carried out:

Step 0: The SINK_DEVICE_IDs of the two in-chain sink devices should be set either manually through a panel button or automatically through EDID to different values. The DAISY_CHAIN_SUPPORT field, also, should be set to '1'.

Step 1: Upon a hot plug true event being detected for a first time after boot up at the source device due to an HDP line toggle, the source device (425) assumes the HDP toggle originated from the most upstream sink device (e.g., sink 0) on the daisy chain even if it did not, and the source device (425) responsively reads sink 0's receiver capability fields (DPCD 00000h thru 0000Bh), its sink/link status field (DPCD 00200h thru 00205h) and its sink specific fields (DPCD 00400h thru 00411h) using the native AUX_CH transaction syntax.

Step 2: When true DAISY_CHAIN_SUPPORT bits ("10"=Support extended AUX_CH syntax to daisy chain in accordance with wide-pipe MDID targeting scheme disclosed here in bits 1:0 of DPCD 00403h) are detected in the downstream local DPCD registers (e.g., 365*c*) by the source device (425), the source device sets bits 1:0 of source specific field (DPCD 00303h) to '10' while first using the native AUX_CH transaction process. Then both the source device and sink device enable their respective extended AUX_CH transaction functions for the wide-pipe MDID targeting scheme disclosed here. After this point all AUX_CH transactions are done using the Extended AUX_CH transaction syntax that includes the DEST_ID field 452 in transaction request signals 450.

Step 3: The source device reads the newly-added (hot plugged in) sink device's EDID data using an I2C-over-ext AUX_CH transaction that also includes use of the DEST_ID field 452 in the transaction request signal.

Step 4: The source device initiates link training for each of the hot plug detected new sink devices (currently just 455, but later it will include 465 and on). This link training will include alignment of the packed together lanes (typically all 4 lanes) and error rate clearing. For purpose of lane alignment, each transceiver device includes variable signal delay means (not explicitly shown) for fine tuning the delay associated with each video lane so that timing skew between lanes that carry video information of a same local monitor is minimized even if the cables of the respective lanes are of different lengths. Packed together lanes are those lanes that carry video stream data of one video frame, where timing skew may lead to noticeable distortion on the video monitor if the timing skew is not reduced to within acceptable tolerances.

Step 5: Once lane alignment is completed for all active lanes, the source device (425) activates the aligned lanes as constituting part of its active main links to the hot plug detected sink devices found thus far in the daisy chain. In accordance with the standard VDP protocol, the number of lanes that define the active main links can be 1, 2 or 4 but not 3. However, the present disclosure need not be limited to this standard and it is within the contemplation of the disclosure that any appropriate number of active lanes can be included as the active lanes in the current main links set of a given source device.

Step 6: When a current, more upstream daisy chain device (e.g., 455) detects a hot plug event from the next downstream device (e.g., 465) during implementation of normal native mode between the source and first in chain sink device (sink 0), the sink 0 device repeats above Steps 1 and 2 as if it were the source device so as to thereby enable extended AUX_CH connection between it (the sink 0 device) and the next downstream sink device (465).

Step 7: After step 6, the Sink 0 device generates an additional hot plug event (the HDP line transitions to 0 for 2 ms or more and then back to 1 again) to the source device on HDP line 446.

Step 8: In response to step 7, the source device repeats above Step 1. If the sink/link status fields are all okay, such as indicating that the lanes have been successfully aligned, the source device 425 issues an extended AUX_CH transaction request 450 with DEST_ID=1 and repeats Step 2 for the sink 1 device.

Step 9: If sink 1's (465) sink/link status fields are not okay, the source device 425 repeats Step 4 in an attempt to re-initialize its main links (active serial links) to extend to the newly-added sink 1 device (465).

Step 10: Once lane alignment is done, the source device activates main links between the source device and the sink 1 device where these activated main links pass through the sink device 0. (See for example the dark arrows showing passthrough through device 455 of FIG. 4 and subsequent capture of the passed-through 4-lane wide data bursts in device 465. The passthrough dark arrows shown in device 475 of FIG. 4 indicate that the burst capturing device 465 also forwards the captured data burst downstream along the daisy chain for possible capture by other downstream sink devices if the MDID value is matched.)

5.2.3 Single Source Device and More than Two Sink Devices: In the case of a single source device (425) and more than two on-chain sink devices (e.g., 455, 465, 475 of FIG. 4), the following HDP relaying process is carried out:

Step 0: SINK_DEVICE_IDs of all sink devices should be set either manually through a panel button or automatically through EDID processing. DAISY_CHAIN_SUPPORT field, also, should be set to '10'.

Step 1: The source device carries out repeats Steps 1 thru 5 in above Section 5.1.2 until all main links between sink devices are aligned and activated.

Step 2: If a hot unplug event is detected in the source device (425) by virtue of an HDP toggle being relayed to the source device (425) and the source discovering that one or more of the previously in-chain devices are no longer in-chain because their local DPCD and EDID registers (e.g., 365*e*, 365*f*) cannot be read, the source repeats Step 1 until all remaining down-stream main links are realigned and activated. For example, if sink 1 is unplugged and re-plugged, all main links between a source and sinks 1, 2, 3, etc. will be broken. The source device repeats Step 1 until all main links between all downstream sink devices are activated. Accordingly, a hot unplug and replug may occur anywhere along the daisy chain rather than only at its most downstream end.

5.3 Main Links

In accordance with the standard VDP protocol the activated main links set of a given source device can be configured as the top 1, 2 or 4 lanes depending on the number of sink devices in daisy chain. However, as indicated above, in accordance with the present disclosure the number of active lanes is preferably set to 4 although not limited to this standard and thus in other environments the activated main links set of a given source device can be configured to other numeric and spatial configurations of active and aligned links as may be appropriate in a given application depending on the maximum bandwidth needed for supporting the highest anticipated video resolution and highest anticipated number of monitors in the daisy chain (e.g., up to 255).

Referring to FIG. 3, it is to be understood that in one embodiment, in addition to signal de-serializers provided in its respective Phy Rx units (e.g., 351a-354a) or in the corresponding data processor 369a, each transceiving-capable sink device may have 4 serial signal amplifying buffers 361a-364a with tunable fine delays provided for example as part of in its respective Phy Tx units (e.g., 381a-384a) for relaying the main link video and/or other burst data downstream to more downstream next sink devices. Each transceiving-capable sink device (e.g., 355, 365) further has two additional pairs of auxiliary channel de-serializers and serializers for bidirectionally relaying serial AUX CH data to a more downstream or more upstream transceiving-capable sink device or to the most upstream source device (325). Each active sink device connects its locally active number of input lane(s) (typically 4) to its internal local bus (e.g., 370A, 370B) and from there to its respective local monitor (e.g., 250', 260'). FIG. 4 shows device 465 doing this. The data processing unit (e.g., 369a, 369b) of the respective sink device operates in accordance with commands sent from the local policy maker (e.g., 365a, 365b) to determine when if at all the video data received by the corresponding Phy Rx unit (e.g., 351a-354a) is to be coupled to the local monitor via the common routing bus (e.g., 370A) and if so, according to what deserializing rules. For example, in the case of field 530 in FIG. 5A (described immediately below), it is seen that successive pixels are successively distributed across the 4 lanes in round robin fashion.

Referring to FIG. 5A, illustrated here is one scheme 500 for selectively embedding MDID bits (fields 520) in a four-lane wide serial data stream 501 in accordance with the present disclosure. In general, the 4 lanes are synchronized as shown although they do not have to be. If the lanes are not closely synchronized to one another, then appropriate data buffering and serial streams resynchronizing means should be provided in the transceiver device data processors (e.g., 369a, 369, etc.) for bringing the streams into synchronism as shown before the transceiver device data processor begins to assemble video or audio data blocks from the serially transmitted streams. As seen in row 509 of FIG. 5A, at the end of a video blanking period (e.g., a horizontal retrace blanking period or 1H), the VDP defined BE character (Blank End character) is transmitted in each of the lanes. This is followed by a supplying of video pixels for a display line number N-1 of a monitor having a predefined MDID value. When transmission of the video pixels for line number N-1 completes, optionally with all zero bytes padding the end of data block 510, four VDP BS characters (Blank Start characters) are output across the four lanes as shown at 512.

In accordance with the VDP protocol, corresponding video blanking identification bytes (VB-ID) are next output along synchronized row 514 wherein bits 0:5 of each such VB-ID byte provide a corresponding ID value. Unlike the conventional approach though wherein bit 7:7 is always zero, in accordance with the present disclosure, if bit 7:7 is a logic '1' (see box 515) this signals that an MDID byte will be inserted after the conventional Maud byte 518. If bit 7:7 is a logic '0' then the optional MDID byte 520 is not inserted and audio data block 522 immediately follows the Maud byte 518 in each respective lane per the conventional VDP protocol. Placement of the MDID insertion flag (bit 7:7) in the VB-ID byte 514 gives the transceiver device processor (e.g., 369a) a time delay of T1 for processing the VB-ID byte 514 before the optional MDID byte 520 appears. If the identification value in the optional MDID byte 520 matches the display monitor ID value of the local monitor then the transceiver device processor (e.g., 369a) copies the subsequent audio (522) and video (530) serial data into its local buffer for processing and forwarding to its local monitor (e.g., 250'). If the MDID byte 520 does not match the display monitor ID value of the local monitor (or a multicast group value that encompasses the local monitor) then the transceiver device processor (e.g., 369a) ignores the passing through audio (522) and video (530) serial data. As seen in row 529 of FIG. 5A, at the end of the video blanking period (e.g., a horizontal retrace blanking period or 1H), the VDP defined BE character (Blank End character) is again transmitted in each of the lanes. This is followed by a supplying of video pixels for a display line number N of the monitor (or multicast group of monitors) having the predefined MDID value defined by the MDID signal of row 520. When transmission of the video pixels for line number N completes, optionally with all zero bytes padding the end of data block 530, four VDP BS characters (Blank Start characters) are again output across the four lanes as shown at 532. Then the process may repeat with another row similar to 514 appearing across the four serial transmission lanes.

Referring to FIG. 5B, a similar scheme 550 may be used for logically associating second data with a corresponding MDID value. The MDID bytes are optionally inserted at row 570 if bit 7:7 of each of the VB-ID bytes of row 564 is set to logic '1'. If not, then the optional MDID bytes row 570 does not appear in the serial transmission streams of lanes 0 through 3 (551). The secondary data which is targeted for processing by transceiver device processors (e.g., 369a) having matching MDID values appears after the Start of Secondary data flag characters (SS) of row 579 and ends with the End of Secondary data flag characters (SE) of row 582. Rows 579-582 may be embraced by dummy character filled blocks 572 and 584. After row 509', the video pixel data 510' for the monitors matching the MDID of row 570 begins. Thus secondary data 580 can be interlaced with video line data 510' and targeted to one or more monitors that having a matching MDID value.

The present disclosure is to be taken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated here. Moreover, if plural examples are given for specific means, or steps, and extrapolation between and/or beyond such given examples is obvious in view of the present disclosure, then the disclosure is to be deemed as effectively disclosing and thus covering at least such extrapolations.

By way of example, it is understood that the configuring of a source device (e.g., 325 of FIG. 3) and/or of a transceiver device (e.g., 355 of FIG. 3) in accordance with the disclosure can include use of a computer (e.g., 220' of FIG. 3) or another external instructing device to selectively control activation or deactivation of the various video stream generators (e.g., 331-33E) and/or to selectively control mapping of serially received bits by respective ones of the local data processing devices (e.g., 369a, 369b) of each transceiver device as desired. A computer-readable medium (not shown) or another form of a software product or machine-instructing means (including but not limited to, a hard disk, a compact disk, a flash memory stick, a downloading of manufactured instructing signals over a network and/or the like) may be used for instructing the instructable machine (e.g., 220') to carry out such selective activation and deactivation processes as may be desired. For example in FIG. 3 it may be desirable to shut off a defective lane or minimize power consumption by powering down one of the Phy Tx units in each of the transceiver devices of a given daisy chain if an upstream device has a defective lane and is thus not passing through video data via that lane to a next downstream device so as to thereby reduce total power consumption. Thus if software in the host computer indicates that video data is not being actively transmitted at the moment over a certain one or more of the daisy chain forming lanes, the host computer may selectively command power down of the video data outputting circuits whose services are not currently needed so as to thereby conserve power. Given this, it is within the scope of the disclosure to have an instructable machine (e.g., 220') carry out, and/to provide ancillary software adapted for causing the instructable machine to carry machine-implemented methods that vary from the default 4-lane wide burst mode described above.

Reservation of Extra-Patent Rights, Resolution of Conflicts, and Interpretation of Terms After this disclosure is lawfully published, the owner of the present patent application has no objection to the reproduction by others of textual and graphic materials contained herein provided such reproduction is for the limited purpose of understanding the present disclosure of invention and of thereby promoting the useful arts and sciences. The owner does not however disclaim any other rights that may be lawfully associated with the disclosed materials, including but not limited to, copyrights in any computer program listings or art works or other works provided herein, and to trademark or trade dress rights that may be associated with coined terms or art works provided herein and to other otherwise-protectable subject matter included herein or otherwise derivable herefrom.

If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

Unless expressly stated otherwise herein, ordinary terms have their corresponding ordinary meanings within the respective contexts of their presentations, and ordinary terms of art have their corresponding regular meanings within the relevant technical arts and within the respective contexts of their presentations herein. Descriptions above regarding related technologies are not admissions that the technologies or possible relations between them were appreciated by artisans of ordinary skill in the areas of endeavor to which the present disclosure most closely pertains.

Given the above disclosure of general concepts and specific embodiments, the scope of protection sought is to be defined by claims appended hereto. The issued claims are not to be taken as limiting Applicant's right to claim disclosed, but not yet literally claimed subject matter by way of one or more further applications including those filed pursuant to 35 U.S.C. §120 and/or 35 U.S.C. §251.

What is claimed is:

1. A daisy chain supporting source device comprising:
   (a) a plurality of real or virtual video stream data generators each structured to formulate video stream data for serial transmission as a burst of plural serial signals over a corresponding plurality of egress serial data links;
   (b) a data packer that packages said formulate video stream data for serial transmission as a burst of plural serial signals over the corresponding plurality of egress serial data links;
   (c) a plurality of video data stream control units each coupled to a respective one of said real or virtual video stream data generators and structured to control the formulation of said video stream data for serial transmission so that the formulation is compatible with a target display monitor that is intended to display an image or a part of an image represented by the video data stream, the video data stream control units being programmable so as support different ones of target display monitors, wherein the video data stream control unit further embedding a multi-device identification (MDID) into the video data stream to the specific target display monitor from the different ones of target display monitors having a data processing unit for matching the MDID; and
   (d) a source side policy maker structured to retrieve local Display Port Configuration Data (DPCD) data and local Extended Display Identification Data (EDIP) data from a plurality of daisy chain connected monitor units and to store the retrieved DPCD data and EDIP data in said second plurality of video data stream control units.

2. The daisy chain supporting source device of claim 1 and further comprising:
   (e) a host interface port operatively coupled to the source side policy maker and to the first plurality of video stream data generators for enabling an external host device to download video data into the video stream data generators and to interact with the source side policy maker.

3. The daisy chain supporting source device of claim 2 wherein at least one of said video stream data generators is implemented by a combination of a graphics data processor and a video data storage memory.

4. The daisy chain supporting source device of claim 1 wherein:
   (c.1) said source side policy maker includes an extended DPCD register set having a daisy chain support register which contains an extended syntax flag for indicating whether an extended AUX_CH syntax is being currently implemented by the daisy chain supporting source device.

5. The daisy chain supporting source device of claim 1 wherein:
   (c.1) said source side policy maker includes an extended DPCD register set having a daisy chain support register which contains a 24 bit unit identification field for uniquely identifying the daisy chain supporting source device as an organizational unit within a predefined organization of other uniquely identifiable units.

6. The daisy chain supporting source device of claim 1 wherein:
   (c.1) said source side policy maker is structured to output command packets by way of an auxiliary data channel where the command packets each contains a destination device identification field designating a daisy chain connected device that is intended to respond to the command packet.

7. The daisy chain supporting source device of claim 6 wherein:
(c.2) said source side policy maker is structured to receive command response packets by way of the auxiliary data channel where the command response packets each contains a responder identification field designating a daisy chain connected device that is the source of the command response packet.

8. A video display apparatus for displaying an image represented by received video signals, the apparatus comprising:
(a) a first port structured to receive a first plurality of serially transmitted digital signals transmitted over a corresponding first plurality of lanes and representing at least part of a video image;
(b) a second port structured to output a second plurality of serially transmitted digital signals over a corresponding second plurality of lanes and representing said at least part of the video image;
(c) a relaying circuit coupled to the first and second ports, the relaying circuit including pass-through buffers for relaying said serially transmitted digital signals from the first port to the second port; and
(d) a data processing unit that processes the serially transmitted digital signals when a multi-device identification (MDID) signal embedded in each of the passing-through serially transmitted digital signals matches an MDID of the video display apparatus, the at least part of a video image being displayed on the video display apparatus only if the MDID embedded in the serially transmitted digital signals matches the MDID of the video display apparatus.

9. The video display apparatus of claim 8 wherein:
said first port includes a Video Electronics Standards Association (VESA) DisplayPort compatible first interface plug; and
said second port includes a VESA-DisplayPort compatible second interface plug.

10. The video display apparatus of claim 9 and further comprising:
a local monitor operatively coupled to the to the selective data processing means for displaying the at least part of the video image represented by the first plurality of serially transmitted digital signals that are selectively processed by the data processing means.

11. The video display apparatus of claim 8 wherein:
said relaying circuit includes a hot-plug detector that can detect when a second video display apparatus similar to said video display apparatus is connected daisy chain style to the second port.

12. The video display apparatus of claim 8 wherein:
said relaying circuit includes an auxiliary channel relay that can bidirectionally relay serial auxiliary channel data, where the relayed auxiliary channel data includes Extended Display Identification Data (EDID) data indicating physical attributes of at least one of one or more local monitors that can be operatively coupled to a daisy chain communication circuit defined by the auxiliary channel relay.

13. A method of daisy chain connecting a plurality of video display units to a video source device where the video source device can output a first plurality of serially transmitted digital signals over a corresponding first plurality of lanes to representing at least part of a video image, the method comprising:
(a) detecting when a first video sink device having a multi-device identification (MDID) has been connected daisy chain style to a video signal relaying circuit driven by the video source device;
(b) in response to said detection of the connection of the first video sink device, automatically fetching local characterizing data from the first video sink device indicative of characteristics of a local display functions associated with the first video sink device; and
(c) displaying at least part of the video image on the first video sink device if an MDID embedded in the serially transmitted digital signal when a local processor matches the MDID of the first video sink device.

14. The daisy chain connecting method of claim 13 wherein said fetching of local characterizing data includes:
automatically reading local Extended Display Identification Data (EDID) data in the first video sink device where the local EDID data indicates physical attributes of at least one local display monitor associated with the first video sink device.

15. The daisy chain connecting method of claim 13 wherein said fetching of local characterizing data includes:
automatically reading local Display Port Configuration Data (DPCD) data in the first video sink device where the local DPCD data indicates a current reconfigurable configuration of at least one local display monitor associated with the first video sink device.

16. A daisy chain transceiver device comprising:
(a) a plurality of video stream data receivers each structured to receive video stream data serially transmitted over a corresponding ingress serial data link;
(b) a local data processor coupled to said first plurality of video stream data receivers and structured to deserialize on-the-fly selected portions of the received video stream data of the plurality of video stream data receivers;
(b) a plurality of video stream data buffers each coupled and structured to receive video stream data output by a corresponding one of the video stream data receivers and to buffer the video stream data;
(c) a plurality of video stream data transmitters each coupled and structured to receive buffered serial data from a corresponding one of the video stream data buffers and to relay the buffered serial data over a corresponding egress serial data link; and
(d) a local output port coupled to the local data processor and structured to forward the on-the-fly selected and deserialized portions of the passing through video data to the local display monitor when the local data processor matches a multi-device identification (MDID) signal embedded in the video stream data with an MDID of the local display monitor.

17. The daisy chain transceiver device of claim 16 and further comprising:
(e) a local policy maker structured to store local DPCD data and local EPI data; and
(f) auxiliary channel data transceivers coupled to the local policy maker and structured to relay auxiliary channel data upstream and downstream of the daisy chain transceiver device.

18. The daisy chain transceiver device of claim 17 wherein:
(e.1) said local policy maker includes an extended DPCD register set having a daisy chain support register which contains an extended syntax flag for indicating whether an extended AUX_CH syntax is being currently implemented by the daisy chain transceiver device.

19. The daisy chain transceiver device of claim 17 wherein:
(e.1) said local policy maker includes an extended DPCD register set having a daisy chain support register which contains a sink device identification field that can provide the daisy chain transceiver device with a unique device identification distinguishing the daisy chain transceiver device from other sink devices along a daisy chain that the daisy chain transceiver device is connected to as a sink device.

20. The daisy chain transceiver device of claim 19 wherein:
said sink device identification field can support at least 5 uniquely identifiable sink devices or at least 5 uniquely identifiable bands of video data.

21. The daisy chain transceiver device of claim 17 wherein:
(e.1) said local policy maker includes an extended DPCD register set having a daisy chain support register which contains a 24 bit unit identification field for uniquely identifying the daisy chain transceiver device as an organizational unit within a predefined organization of other uniquely identifiable units.

22. The daisy chain transceiver device of claim 17 wherein:
(f.1) said auxiliary channel data transceivers are further structured to relay hot-plug detection signals from downstream sink devices along the daisy chain in which the daisy chain transceiver device resides to upstream devices.

23. The daisy chain transceiver device of claim 17 wherein:
(e.1) said local policy maker is structured to respond to command packets relayed to it by way of one or more auxiliary channel data transceivers when the command packet contains a destination identification field designating the daisy chain transceiver device as a target of the command.

24. The daisy chain transceiver device of claim 17 wherein:
(e.1) said local policy maker is structured to output command response packets by way of one of its auxiliary channel data transceivers where the command response packet contains a sink device identification field designating the daisy chain transceiver device as the source of the command response packet.

* * * * *